(12) United States Patent
Wang et al.

(10) Patent No.: US 11,334,544 B2
(45) Date of Patent: May 17, 2022

(54) METHOD, APPARATUS, DEVICE AND MEDIUM FOR STORING AND QUERYING DATA

(71) Applicant: BEIJING BAIDU NETCOM SCIENCE AND TECHNOLOGY CO., LTD., Beijing (CN)

(72) Inventors: Jie Wang, Beijing (CN); Jian Wu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 64 days.

(21) Appl. No.: 16/691,085

(22) Filed: Nov. 21, 2019

(65) Prior Publication Data
US 2020/0272610 A1    Aug. 27, 2020

(30) Foreign Application Priority Data
Feb. 27, 2019    (CN) .......................... 201910147197.4

(51) Int. Cl.
*G06F 16/22*     (2019.01)
*G06F 16/23*     (2019.01)
*G06F 16/2455*   (2019.01)

(52) U.S. Cl.
CPC ...... *G06F 16/2228* (2019.01); *G06F 16/2282* (2019.01); *G06F 16/2379* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 6,708,178 B1 | 3/2004 | Chong et al. | |
| 10,331,642 B2* | 6/2019 | Bi | G06F 16/2228 |
| 10,936,559 B1* | 3/2021 | Jones | G06F 16/24562 |
| 2001/0050955 A1 | 12/2001 | Zhang et al. | |
| 2011/0029478 A1 | 2/2011 | Broeker | |
| 2015/0347479 A1 | 12/2015 | Chen et al. | |

(Continued)

FOREIGN PATENT DOCUMENTS

| | | |
|---|---|---|
| CN | 101162469 A | 4/2008 |
| CN | 101295323 A | 10/2008 |

(Continued)

OTHER PUBLICATIONS

Chinese Office Action, for Chinese Application No. 201910147197.4, dated Sep. 3, 2021, 10 pages.

(Continued)

*Primary Examiner* — Richard L Bowen
(74) *Attorney, Agent, or Firm* — Seed IP Law Group LLP (57) ABSTRACT

Embodiments of the present disclosure relate to a method, apparatus, device, and medium for storing and querying data. The method for storing data includes: generating, for to-be-stored data, a primary index for indexing the data. The method further includes: writing the primary index arid the data into a data row in a data table. The method further includes: generating a secondary index for indexing the primary index based on a query rule of the data table and the data. In addition, the method further includes: writing the secondary index and the primary index into an index row in the data table.

24 Claims, 7 Drawing Sheets

(56) References Cited

U.S. PATENT DOCUMENTS

| | | | |
|---|---|---|---|
| 2016/0132535 A1* | 5/2016 | Cheng | G06F 16/2255 |
| | | | 707/747 |
| 2017/0193041 A1 | 7/2017 | Fuchs | |
| 2018/0239800 A1* | 8/2018 | Guo | G06F 16/248 |
| 2018/0276262 A1 | 9/2018 | Bi et al. | |
| 2019/0146980 A1* | 5/2019 | Choudhary | G06F 16/273 |
| | | | 707/613 |
| 2020/0210496 A1* | 7/2020 | Du | G06F 16/951 |
| 2020/0250095 A1* | 8/2020 | Chen | G06F 16/172 |

FOREIGN PATENT DOCUMENTS

| | | | |
|---|---|---|---|
| CN | 101435708 A | | 5/2009 |
| CN | 102567314 A | | 7/2012 |
| CN | 102768674 A | | 11/2012 |
| CN | 105740405 A | | 7/2016 |
| CN | 108170726 A | | 6/2018 |
| CN | 109299110 A | | 2/2019 |
| CN | 109376173 A | | 2/2019 |
| EP | 3236365 A1 | | 10/2017 |
| EP | 3370167 A1 | | 9/2018 |
| JP | 61-220027 A | | 9/1986 |
| JP | 2008-533564 A | | 8/2008 |
| JP | 6092493 B1 | | 3/2017 |

OTHER PUBLICATIONS

Chinese Office Action, for Chinese Application No. 201910147197.4, dated Aug. 6, 2020, 12 pages.

Hbase Secondary Index, with English abstract, Sep. 18, 2018, 4 pages.

EP 19 210 507.0—Communication pursuant to Article 94(3) EPC, 7 pages.

Fox et al., "Spatio-temporal Indexing in Non-relational Distributed Databases," 2013 IEEE International Conference on Big Data, pp. 291-299.

Weinstock-Herman, Eli, "Adding Indexes for a Key/Value Store," technical posts, Jan. 2, 2019, 8 pages.

Homer et al., "Cloud Design Patterns," Microsoft, 2017, 7 pages.

* cited by examiner

| Key | Value |
|---|---|
| Secondary index 410-1 | Primary index 420-1 |
| Secondary index 410-2 | Primary index 420-2 |
| ... ... | ... ... |
| Primary index 420-1 | Data 430-1 |
| Primary index 420-2 | Data 430-2 |
| ... ... | ... ... |

Fig. 4A

| Key | Value |
|---|---|
| Secondary index 410-1 | Primary index 420-1 |
| Secondary index 410-2 | Primary index 420-2 |
| Secondary index 410-3 | Primary index 420-1 |
| Primary index 420-1 | Data 430-3 |
| Primary index 420-2 | Data 430-2 |
| ... ... | ... ... |

METHOD, APPARATUS, DEVICE AND MEDIUM FOR STORING AND QUERYING DATA

CROSS-REFERENCE TO RELATED APPLICATIONS

This application claims priority to Chinese Application No. 201910147197.4, on Feb. 27, 2019 and entitled "Method, Apparatus, Device and Medium for Storing and Querying Data," the entire disclosure of which is hereby incorporated by reference.

TECHNICAL FIELD

Embodiments of the present disclosure relate to the field of computer, and more specifically to a method, apparatus, device, and computer readable storage medium for storing and querying data.

BACKGROUND

Knowledge map, also known as knowledge base, is used to describe various entities that exist in the real world, the relationships between the entities, and the respective attributes of the entities. At present, knowledge maps are widely used in the fields of search, artificial intelligence, deep learning and the like.

With the rapid growth in the size of data in the knowledge map and the application of the data, entity data in the knowledge map may face frequent updates. In addition, in the various aspects of knowledge map generation, it is usually necessary to incrementally modify the entity data in the knowledge map. Accordingly, it is desirable to provide techniques for storing and querying entity data in a knowledge map to ensure that the performance of data writing and data query does not degrade in scenarios where the entity data are frequently updated.

SUMMARY

According to example embodiments of the present disclosure, a solution for storing and querying data is provided.

In a first aspect, an embodiment of the present disclosure provides a method for storing data. The method includes: generating, for to-be-stored data, a primary index for indexing the data; writing the primary index and the data into a data row in a data table; generating a secondary index for indexing the primary index based on a query rule of the data table and the data; and writing the secondary index and the primary index into an index row in the data table.

In a second aspect, an embodiment of the present disclosure provides a method for querying data. The method includes: determining an index that a query request from one or more index rows of a data table, in response to receiving the query request for data stored in the data table, the index row storing a primary index for indexing the data and a secondary index for indexing the primary index determining, from one or more data rows of the data table, a data row associated with the index row based on the primary index in the index row, the data row storing the primary index and the data; determining whether the index row matches the data row; and acquiring, in response to determining that the index row matches the data row, the data from the data row as a response to the query request.

In a third aspect, an embodiment of the present disclosure provides an apparatus for storing data. The apparatus includes: a primary index generation module, configured to generate, for to-be-stored data, a primary index for indexing the data; a data row writing module, configured to write the primary index and the data into a data row in a data table; a secondary index generation module, configured to generate a secondary index for indexing the primary index based on a query rule of the data table and the data; and an index row writing module, configured to write the secondary index and the primary index into an index row in the data table.

In a fourth aspect, an embodiment of the present disclosure provides an apparatus for querying data. The apparatus includes: an index row determining module, configured to determine an index row that matches a query request from one or more index rows of a data table, in response to receiving the query request for data stored in the data table, the index row storing a primary index for indexing the data and a secondary index for indexing the primary index; a data row determining module, configured to determine, from one or more data rows of the data table, a data row associated with the index row based on the primary index in the index row, the data row storing the primary index and the data; a matching module, configured to determine whether the index row matches the data row; and a data acquisition module, configured to acquire, in response to determining that the index row matches the data row, the data from the data row as a response to the query request.

In a fifth aspect, an embodiment of the present disclosure provides a device for storing data. The device includes: one or more processors; and a storage apparatus, for storing one or more programs, where the one or more programs, when executed by the one or more processors, cause the one or more processors to implement the method according to the first aspect.

In a sixth aspect, an embodiment of the present disclosure provides a device for querying data. The device includes: one or more processors; and a storage apparatus, for storing one or more programs, where the one or more programs, when executed by the one or more processors, cause the one or more processors to implement the method according to the second aspect.

In a seventh aspect, an embodiment of the present disclosure provides a computer readable medium, storing a computer program thereon, where the computer program, when executed by a processor, implements the method according to the first aspect.

In an eighth aspect, an embodiment of the present disclosure provides a computer readable medium, storing a computer program thereon, where the computer program, when executed by a processor, implements the method according to the second aspect.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

With reference to the accompanying drawings and the following detailed description, the above and other features, advantages and aspects of embodiments of the present disclosure will become more apparent. In the accompanying drawings, the same or similar reference numerals indicate the same or similar elements.

DETAILED DESCRIPTION OF EMBODIMENTS

Embodiments of the present disclosure will be further described below in detail with reference to the accompanying drawings. Although certain embodiments of the present disclosure are shown in the accompanying drawings, it may be understood that the present disclosure may be implemented in various forms and should not be construed as limited to embodiments set forth herein. On the contrary, embodiments are provided to provide a more comprehensive and complete understanding of the present disclosure. It maybe appreciated that the accompanying drawings and embodiments of the present disclosure are for illustrative purposes only and are not intended to limit the scope of the present disclosure.

In the description of embodiments of the present disclosure, the term "comprises" and the like are to be understood as open-ended, i.e., "including but not limited to". The term "based on" should be understood as "based at least in part." The term "one embodiment" or "an embodiment" should be understood as "at least one embodiment." The terms "first," "second," and the like may refer to different or identical objects. Other explicit and implicit, definitions may also be included below.

As described above, with the rapid growth in the size of data in the knowledge map and the application of the data, the data in the knowledge map may face frequent updates. In addition, in the various aspects of knowledge map generation, it is usually necessary to incrementally modify the data in the knowledge map. These updates and modifications often rely on an ability to query data in the knowledge map by a storage system.

The data in the knowledge map may usually be represented by a triplet in the form of subject-predicate-object (SPO). Taking an entity "scindapsus aureus" as an example, data associated with the entity (also referred to as "entity data") includes, for example, "the biological classification of scindapsus aureus is monocotyledon" (here, "scindapsus aureus" is the subject, "biological classification" is the predicate, and "monocotyledon" is the object), "the family of scindapsus aureus is Araceae" (here, "scindapsus aureus" is the subject, "family" is the predicate, and "Araceae" is the object), and the like.

Taking the SPO data "the biological classification of scindapsus aureus is monocotyledon" as an example, if the entity "scindapsus aureus" and the entity "monocotyledon" are considered as two nodes, the relationship "biological classification" is considered as an edge connecting the two nodes, then the edge may be referred to as the "out edge" or "positive edge" of the node representing the entity "scindapsus aureus" and may be referred to as the "in edge" or "inverse edge" of the node representing the entity "monocotyledon". The entity "monocotyledon" may be referred to as the "out edge entity" or "positive edge entity" of the entity "scindapsus aureus". The entity "scindapsus aureus" may be referred to as the "in edge entity" or "inverse edge entity" of the entity "monocotyledon". The relationship between entity "scindapsus aureus" relative to the entity "monocotyledon" is also referred to as the "out edge relationship" or "positive edge relationship", and the relationship between the entity "monocotyledon" relative to the entity "scindapsus aureus" is also referred to as the "in edge relationship" or "inverse edge relationship". Further, for convenience of explanation, an entity as the object in an SPO triplet is referred to herein as the "object" or an "object entity."

The entity data in the knowledge map may be represented in a variety of forms. For example, an example of entity data in JASON format is as follows:

```
{
  "@id": "01rzgh7j",
  "@type+38: ["Plant"],
  "name": [{
    "@value": "scindapsus aureus",
    "@lang": "zh-cn",
    "@fromurl": "http:/ /abc.com/ . . . "
  }],
  "biologyClass": [{
    "@id+38: "01702179",
    "@value": "monocotyledon"
  }]
  "biologyFamily": [{,
    "@fromurl": "http:/ /def.com/ . . . ",
    "@id": "01mmz91r"
    "@value": "Araceae"
  }]
}
```

In the above entity data of the JASON format, the name of the subject is "scindapsus aureus", and the corresponding entity Identifier (id) is "01rzgh7j". The predicate is "biologyClass", the value of the object is "monocotyledon", and the corresponding entity identifier is "01702179". Another predicate is "biologyFamily", the value of the object is "Araceae", and the corresponding entity identifier is "01mmz91r".

In the generation and use of the knowledge map, it is desirable to be able to store the above entity data and perform various query operations on the stored entity data. For example, querying all information related to scindapsus aureus, that is, querying all SPO data for the given subject (S). As another example, querying biological classification information of scindapsus aureus, that is, the combination (SP) of the subject and the predicate is given, querying SPO data related to the combination. As another example, querying all entities (in edge entities) that have monocotyledon as the object, that is, the object (O) is given, querying the subject (S) associated with the object. As another example, querying all entities biologically classified as monocotyledon, that is, the combination of the object (O) and the predicate (P) is given, querying the subject (S) associated with the combination, and the like.

Some conventional solutions use a database such as mongoDB for the storage and query of the entity data. A MonogoDB-based storage system typically relies on establishing multiple indexes on a single data table, and implementing query for an inverse edge entity by querying of the multiple indexes. However, the multiple indexes tend to seriously affect the write performance of the data table, and therefore cannot adapt to an application scenario in which the entity data is frequently updated. Other conventional solutions use a graph retrieval system such as GraphIndex for the storage and query of the entity data. This type of solution can implement graph query techniques for static entity datasets. However, when any entity node is updated, an edge connected with the entity node often needs to be updated accordingly, which brings a large update overhead. Therefore, it cannot adapt to an application scenario in which the entity data is frequently updated.

According to an embodiment of the present disclosure, a solution for storing and querying data is proposed. The solution enables low-cost and scalable storage and query techniques for entity data in a knowledge map to solve the above issues and/or other potential issues. The solution stores the entity data and a primary index for indexing the entity data in a data row of a data table, and establishes a secondary index for indexing the primary index based on a query rule for the data table. The secondary index and the primary index are stored in an index row in the same data table. When the entity data is updated, a new secondary index is generated and written to a new index row of the data table along with the primary index. The removal of the old index row is delayed until the actual data query is executed. In this way, embodiments of the present disclosure can ensure that the performance of data writing and data query does not degrade when entity data in a knowledge map is frequently updated.

Embodiments of the present disclosure are specifically described below with reference to the accompanying drawings.

Figure 1:
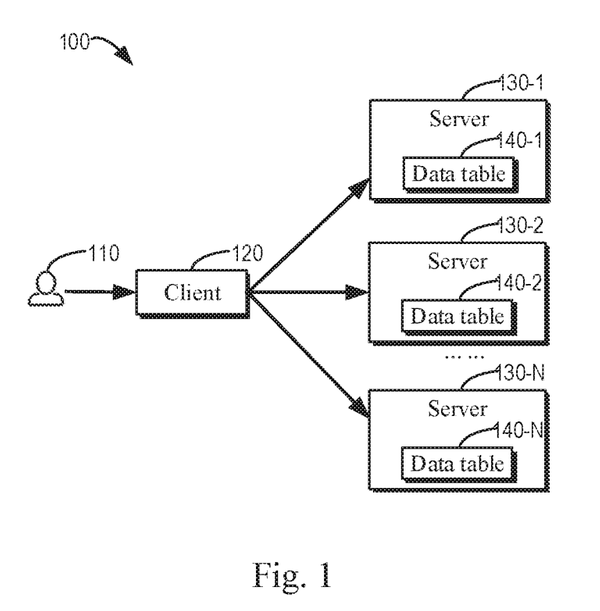
FIG. 1 shows a block diagram of an example system according to an embodiment of the present disclosure.

FIG. 1 shows a block diagram of an example system 100 according to an embodiment of the present disclosure. As shown in FIG. 1, the example system 100 may generally include a client 120 and a plurality of servers 130-1, 130-2, . . . , 130-N (collectively or individually referred to as "server 130", where N is a natural number). The plurality of servers 130 are associated with a plurality of data tables 140-1, 140-2, . . . , 140-N, respectively (collectively or individually referred to as "data table 140", where N is a natural number). It should be understood that the structure and function of the system 100 are described for illustrative purposes only in FIG. 1, without implying any limitation to the scope of the present disclosure. Embodiments of the present disclosure may also be applied to environments having different structures and/or functions.

When performing storage of entity data, a user 110 may input to-be-stored data (e.g., the entity data in JASON format as described above) to the client 120. The client 120 may forward the to-be-stored data to one or more servers 130, such as server 130-1. The server 130-1 may store the received entity data into the data table 140-1.

Although it is shown in FIG. 1 that each server 130 is associated with a single data table 140, it should be understood that this is for illustrative purposes only and is not intended to limit the scope of the present disclosure. In some embodiments, each server 130 may be associated with a plurality of data tables. In other embodiments, a single data table may be divided into a plurality of data fragments, and each server 130 may be associated with only at least some of the plurality of data fragments. That is, a single data table may be stored across a plurality of servers 130.

When performing querying of entity data, the user 110 may input a query request to the client 120. The query request may include, for example but not limited to, querying an entity having a specific attribute value, querying an entity having a specific relationship to a specific object, querying an out edge relationship between a specific entity and a specific object, querying an in edge relationship between a specific entity and a specific object; querying data related to a specific entity; querying an entity having a specific out edge relationship; and querying an entity having a specific in edge relationship, and the like. The client 120 may forward the query request to a plurality of servers 130. Each server 130 may query the entity data in the stored data table 140 to acquire a query result. Each server 130 may return its query result to the client 120. The client 120 may merge the query result from each server 130 and return the merged query result to the user 110.

Figure 2:
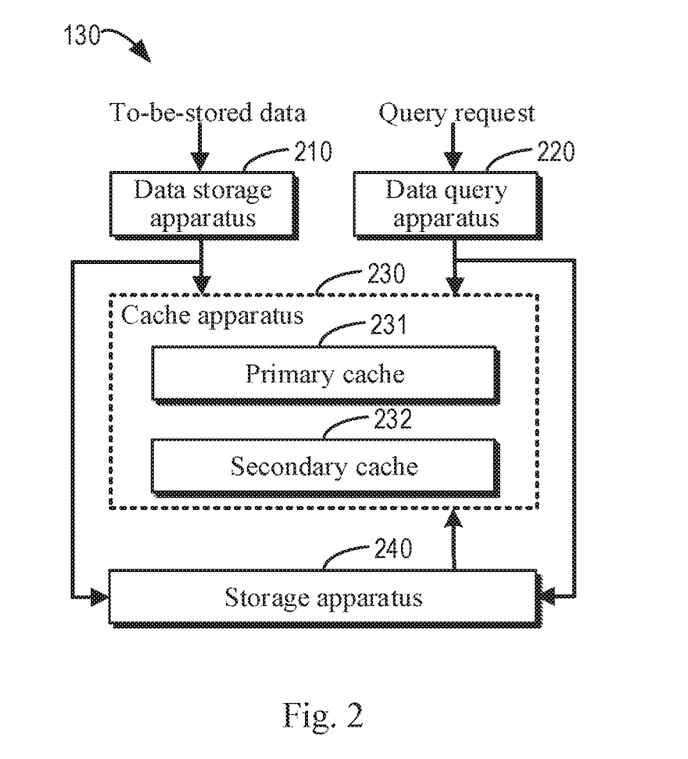
FIG. 2 shows a block diagram of an example server for storing and querying data according to an embodiment of the present disclosure.

FIG. 2 shows a block diagram of an example server 130 according to an embodiment of the present disclosure. As shown in FIG. 2, the example server 130 may generally include a data storage apparatus 210, a data query apparatus 220, a cache apparatus 230, and a storage apparatus 240. It should be understood that the structure and function of the server 130 are described for illustrative purposes only in FIG. 2, without implying any limitation to the scope of the present disclosure. Embodiments of the present disclosure may also be applied to servers having different structures and/or functions.

As shown in FIG. 2, the data storage apparatus 210 may receive to-be-stored data from the client 120 and store the to-be-stored data into the data table 140 at the server 130. The data table 140 may be stored in the storage apparatus 240. To improve the query performance of the data table 140, at least a portion of the data in the data table 140 maybe cached into the cache apparatus 230. The operation of the data storage apparatus 210 will be described in detail below in conjunction with FIG. 3.

As shown in FIG. 2, the data query apparatus 220 may receive the query request from the client 120 and perform a query operation on the data table 140 stored at the server 130 based on the query request. The operation of the data query apparatus 220 will be described in detail below in conjunction with FIG. 5.

Figure 3:
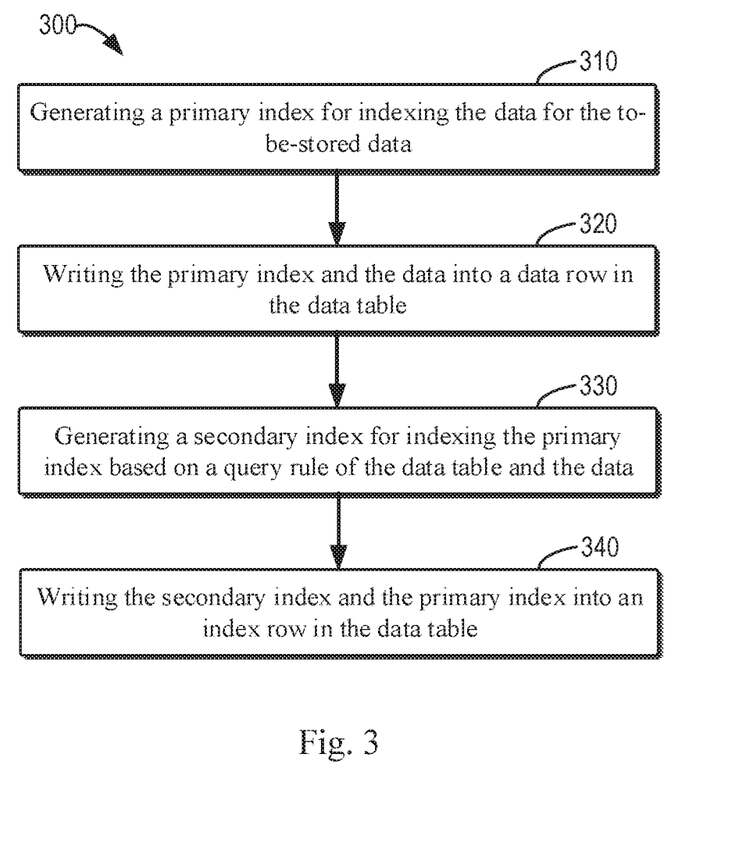
FIG. 3 shows a flowchart of a method for storing data according to an embodiment of the present disclosure.

FIG. 3 shows a flowchart of a method 300 for storing data according to an embodiment of the present disclosure. For example, the method 300 may be performed by the data storage apparatus 210 as shown in FIG. 2. The method 300 will be described in detail below in conjunction with FIG. 2. It should be understood that the method 300 may also include additional blocks not shown and/or may omit blocks shown. The scope of the present disclosure is not limited in this respect.

At block 310, the data storage apparatus 210 generates a primary index for indexing the data for the to-be-stored data.

In some embodiments, the to-be-stored data may record information related to an entity in a knowledge base. Hereinafter, the data in JASON format regarding the entity "scindapsus aureus" as described above is used as an example of the to-be-stored data. In some embodiments, for example, the data storage apparatus 210 may extract an identifier (i.e., "01rzqh7j") of the entity "scindapsus aureus" from the data and use the identifier as the primary index for indexing the data. It should be understood that this is just one example method for generating a primary index. In other embodiments, the data storage apparatus 210 may also generate the primary index for indexing the data based on the identifier of the entity and/or other information.

At block 320, the data storage apparatus 210 writes the generated primary index and the to-be-stored data into a data row in the data table 140.

Figure 4A:
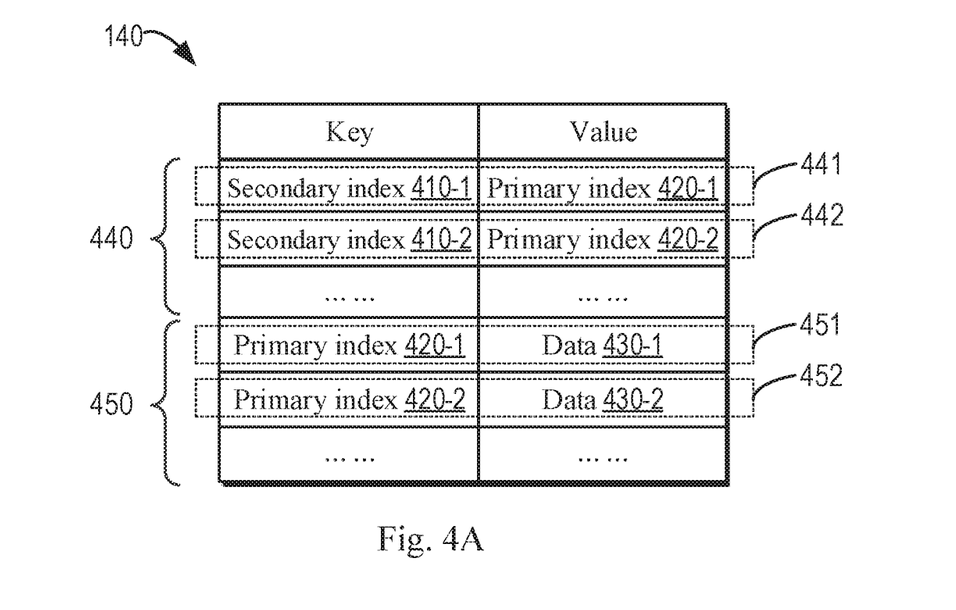
FIGS. 4A and 4B show schematic diagrams of an example data table according to embodiments of the present disclosure.

In some embodiments, the data table 140 is, for example, a data table in a distributed storage system HBase (or a data fragment in an HBase data table). HBase is a high-reliability, high-performance, column-oriented and scalable distributed storage system that stores data in units of rows. In some embodiments, the rows in the data table 140 may be divided into data rows and index rows. The "data row" as used herein refers to a row in which target data is stored, and the "index row" refers to a row in which only index information is stored. FIG. 4A shows a schematic diagram of the example data table 140 according to an embodiment of the present disclosure. As shown in FIG. 4A, the data table 140 (a data fragment of a HBase data table or a HBase data table) may include an index area 440 and a data area 450. The data area 450 may include a plurality of data rows 451, 452, and the like. The index area 440 may include a plurality of index rows 441, 442, and the like.

In some embodiments, the data storage apparatus 210 may write the primary index and the to-be-stored data into the data row by using the generated primary index as the rowkey of the data row and the to-be-stored data as the value of the data row. For example, taking the data row 451 in FIG. 4A as an example, a primary index 420-1 is used as the rowkey of the data row 451, and corresponding data 430-1 is used as the value of the data row 451. Taking the data row 452 in FIG. 4A as an example, a primary index 420-2 is used as the rowkey of the data row 452, and corresponding data 430-2 is used as the value of the data row 452.

At block 330, the data storage apparatus 210 generates a secondary index for indexing the primary index based on a query rule of the data table 140 and the to-be-stored data.

In some embodiments, the data storage apparatus 210 may acquire index configuration information of the data table 140. For example, the index configuration information of the data table 140 may be pre-stored in a relational database (e.g., MySQL) associated with the data table 140. In some embodiments, the index configuration information may, for example, indicate information such as an identifier of the associated data table 140 (e.g., a table name), a query rule supported by the data table 140, or a processing rule for a dirty index row in the data table 140 (i.e., an index row that does not match the data row associated therewith). In some embodiments, the data storage apparatus 210 may generate the secondary index for indexing the primary index based on the query rule of the data table 140 indicated in the index configuration information and the to-be-stored data itself.

In some embodiments, the query rule of the data table 140 may, for example, indicate a query mode supported by the data table 140. The target data stored in the data table 140 is the entity data in the knowledge base. Taking the entity data in JASON format of the entity "scindapsus aureus" as described above as an example, which describes one or more attribute values of the entity "scindapsus aureus", and/or a corresponding relationship between the entity "scindapsus aureus" and one or more object entities (e.g., the object entity "monocotyledon", "Araceae"). In some embodiments, the query mode supported by the data table 140 may be, for example, one of: querying an entity having a specific attribute value in the data table 140 (e.g., querying an entity of type "plant"), querying an entity having a specific relationship to a specific object (e.g., querying an entity of "biological classification" being "monocotyledon"), querying an out edge relationship between a specific entity and a specific object (e.g., querying an out edge relationship between "scindapsus aureus" and "monocotyledon", that is, querying the relationship between "scindapsus aureus" relative to "monocotyledon"), querying an in edge relationship between a specific entity and a specific object (e.g., querying an in edge relationship between "scindapsus aureus" and "monocotyledon", that is, querying the relationship between "monocotyledon" relative to "scindapsus aureus"), querying data related to a specific entity (e.g., querying all SPO data of the entity "scindapsus aureus"), querying an entity having a specific out edge relationship (e.g., querying an entity having an out edge relationship of "biological classification"), and querying an entity having a specific in edge relationship (e.g., querying an entity having an in edge relationship of "biological classification").

In some embodiments, the data storage apparatus 210 may generate the secondary index for indexing the primary index by parsing the semantics of the SPOs in the entity data based on the query rule of the data table 140. Additionally, in some embodiments, the data storage apparatus 210 may generate the secondary index by prefixing the starting primary key of the data table 140 as the secondary index.

Taking the query rule "querying an entity of biological classification being monocotyledon" as an example, the query rule indicates querying an entity that is the subject S, in the case of the object O and the predicate P in SPO triplet is given. For example, the secondary index may be divided into three segments, each separated by a symbol "|". The first segment may be used to store the starting primary key of the data table 140 and the identifier of the object O, separated by a symbol "". Assuming that the starting primary key of the data table 140 is "01akbg1g", the first segment is, for example, "01akbg1g'01702179". The second segment may be an expression of JasonPath related to the query rule. For this example, the second segment is for example "$.biologyClass.@id". The third segment may be the identifier of the entity as the subject S, that is, the rowkey of the entity data to be queried. For this example, the third segment is for example "01rzqh7j". That is, for the query rule "querying an entity of biological classification being monocotyledon", the generated secondary index is "01akbg1g'01702179|$.biologyClass.@id|01rzqh7j". For another example, the query rule "querying an entity belonging to family Araceae" is taken as an example, and the generated secondary index is "01akbg1g'01mmz91r|$.biologyFamily.@id|01rzqh7j".

At block 340, the data storage apparatus 210 writes the secondary index and the primary index into an index row in the data table 140.

In some embodiments, the data storage apparatus 210 may write the secondary index and the primary index into the index row by using the generated secondary index as the rowkey of the index row and the primary index of the rowkey of the data row as the value of the index row. For example, an index row 441 in FIG. 4A is taken as an example, which is associated with a data row 451. A secondary index 410-1 is used as the rowkey of the index row 441, and the primary index 420-1 of the rowkey of the data row 451 is used as the value of the index row 441. Taking the index row 442 in FIG. 4A as an example, it is associated with the data row 452. A secondary index 410-2 is used as the rowkey of the index row 442, and the primary index 420-2 of the rowkey of the data row 452 is used as the value of the index row 442.

Additionally or alternatively, in some embodiments, the data storage apparatus 210 may perform the writing of data row and index row associated with each other as a batch task operation to ensure the atomicity of the writing of data row and index row and the consistency of data row and index row.

Additionally or alternatively, in some embodiments, when there are a plurality of data fragments in the data table 140, the data storage apparatus 210 needs to ensure that the index row and data row associated with each other (e.g., the index row 441 and the data row 451) are always stored in the same data fragment, so that the index and data are accessed at the same server when querying, thus avoiding an extra overhead caused by accessing the index and data at different servers. To achieve this purpose, for example, when generating the rowkey (i.e., secondary index) of the index row, the data storage apparatus 210 may prefix the starting primary key of the data fragment in which the data row is located as the rowkey of the index row. In this way, the data storage apparatus 210 can ensure that the index row and data row associated with each other are always stored in the same data fragment of the same data table. In addition, when the data fragments of the data table 140 are split or a plurality of data fragments are merged, the data storage apparatus 210 may split or merge the index row and data row associated with each other in synchronization, and also ensure that the index row and data row associated with each other are always stored in the same data fragment of the same data table.

In some embodiments, such as when writing data rows and index rows into an HBase data table, the data storage apparatus 210 may cause the rowkeys of the index rows to be lexicographically ranked before the rowkeys of the data rows, thereby making the first half of the same data table (or the same data fragment of the data table) is the index area and the second half is the data area. In addition, the values of the index rows and the values of the data rows may be stored in different column clusters of the HBase data table, thereby realizing physical separation of the index rows from the data rows.

In this way, the entity data of the knowledge map can be written into the data table 140 for subsequent queries.

Figure 4B:
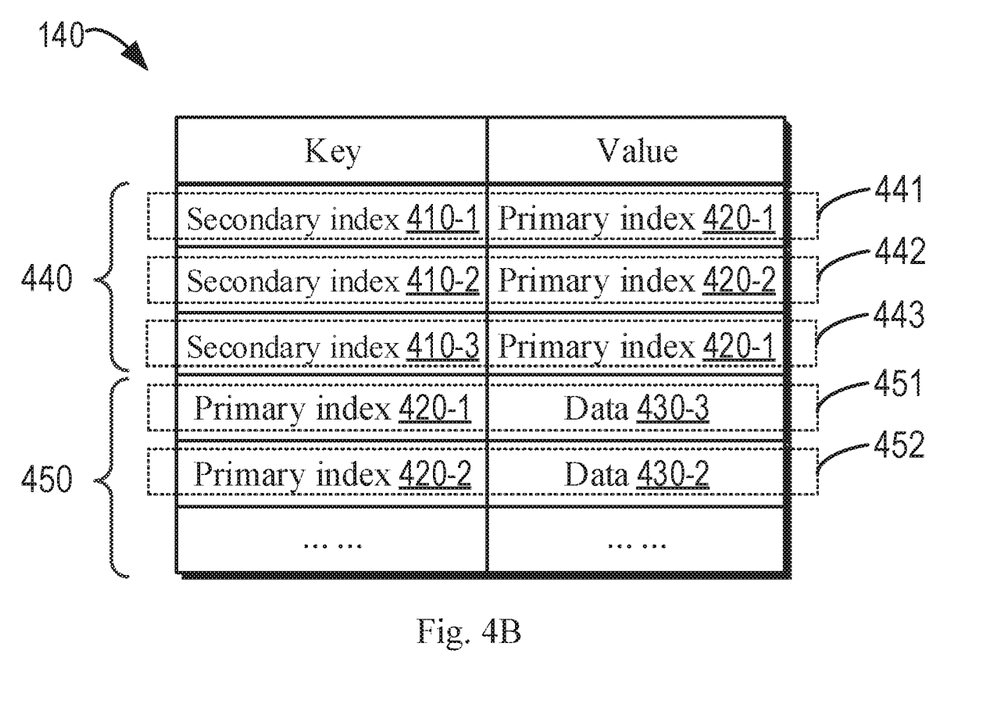

In some embodiments, the data storage apparatus 210 may also receive a request from the client 120 to update the entity data. For example, as shown in FIG. 4B, when the data storage apparatus 210 receives a request to update the original data 430-1 in the data row 451 as shown in FIG. 4A to the data 430-3, the data storage apparatus 210 may write the data 430-3 into the data row 451. The data storage apparatus 210 may generate a new secondary index 410-3 for indexing the original primary index 420-1 based on the updated data 430-3 and the query rule of the data table 140, and write the new secondary index 410-3 and the original primary index 420-1 into a new index row 443. As shown in FIG. 4B, the old index row 441 is not immediately removed from the data table 140. As will be described in further detail below in conjunction with FIG. 5, the removal of the old index row 441 maybe delayed until the actual query is performed, thereby ensuring that the write performance of the data table 140 does not degrade when frequently updated. Additionally or alternatively, in some embodiments, updates to data rows and writes of new index rows may be performed as a batch task operation to ensure the consistency of updated data rows and new index rows.

In some embodiments, the data storage apparatus 210 may store the data table 140 into the storage apparatus 240 as shown in FIG. 2. The storage apparatus 240 may be implemented, for example, using a first storage medium. In order to improve the query performance of the data table 140, the index area 440 in the data table 140 may be cached, for example, into a primary cache 231 as shown in FIG. 2. The primary cache 231 may be implemented, for example, using a second storage medium. In addition, the data area 450 in the data table 140 may be cached, for example, into a secondary cache 232 as shown in FIG. 2. The secondary cache 232 may be implemented, for example, using a third storage medium.

In some embodiments, the access speed of the second storage medium for implementing the primary cache 231 exceeds the access speed of the third storage medium for implementing the secondary cache 232, and the access speed of the third storage medium exceeds the access speed of the first storage medium for implementing the storage apparatus 240. For example, an example of the first storage medium is a magnetic disk, an example of the second storage medium is a memory, and an example of the third storage medium s a solid state disk. The above listed are only examples of the first storage medium, the second storage medium, and the third storage medium, and these examples are not intended to limit the scope of the present disclosure. It should be understood that other storage mediums may also be used to implement the storage apparatus 240 and the cache apparatus 230 as shown in FIG. 2.

Figure 5:
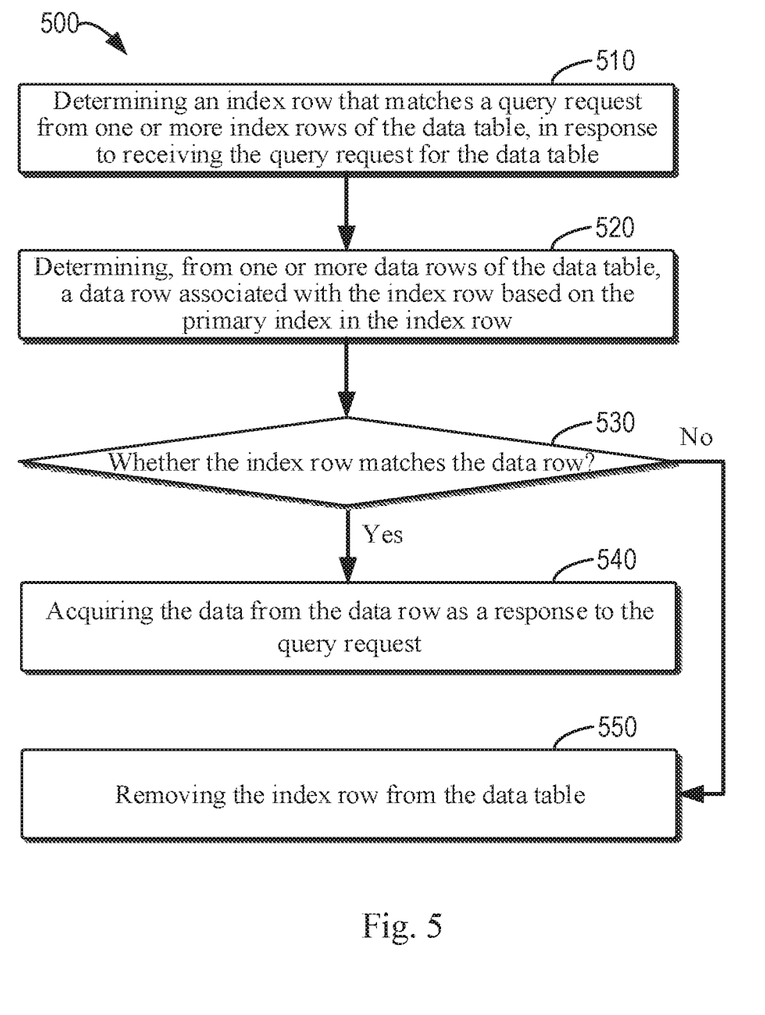
FIG. 5 shows a flowchart of a method for querying data according to an embodiment of the present disclosure.

FIG. 5 shows a flowchart of a method 500 for querying data according to an embodiment of the present disclosure. For example, the method 500 may be performed by the data query apparatus 220 as shown in FIG. 2. The method 500 will be described in detail below in conjunction with FIG. 2. It should be understood that the method 500 may also include additional blocks not shown and/or may omit blocks shown. The scope of the present disclosure is not limited in this respect.

At block 510, the data query apparatus 220 determines an index row that matches a query request from one or more index rows of the data table 140, in response to receiving the query request for data stored in the data table 140, the index row storing a primary index for indexing the data and a secondary index for indexing the primary index.

In some embodiments, the data query apparatus 220 may determine at least one part of the secondary index based on at least a keyword in the query request, and determine an index row that matches the at least one part of the secondary index from the one or more index rows of the data table 140.

Taking a query request "querying the inverse edge entity of monocotyledon" as an example, the query request gives, for example, the identifier (i.e., 01702179) of the object O in the SPO triplet. The data query apparatus 220 may determine the prefix "01akbg1g'01702179" of the secondary index by splicing the starting primary key (for example, 01akbg1g) of the data table 140 (or a certain data fragment of the data table) with the identifier of the object O. The data query apparatus 220 may scan the index area 440 of the data table 140 based on the determined prefix of the secondary index to determine the index row that matches the determined prefix of the secondary index.

In some embodiments, at least one part of the index area 440 of the data table 140 has been cached, for example, into the primary cache 231 as shown in FIG. 2. In this case, the data query apparatus 220 may first perform scanning of the index row in the primary cache 231. If the index row that matches the determined prefix of the secondary index has been cached into the primary cache 231, the data query apparatus 220 may determine the index row in the primary cache 231. Otherwise, the data query apparatus 220 may perform scanning of the index row in the storage apparatus 240 to determine the index row from the storage apparatus 240. In some embodiments, when the index row is determined from the storage apparatus 240, the data query apparatus 220 may the index row into the primary cache 231 to improve the efficiency of subsequent queries.

At block 520, the data query apparatus 220 determines, from one or more data rows of the data table, a data row associated with the index row based on the primary index in the index row, the data row storing the primary index and the data.

In some embodiments, the data query apparatus 220 may scan the data area 450 of the data table 140 based on the determined primary index in the index row to determine the data row that matches the primary index.

In some embodiments, at least one part of the data area 450 of the data table 140 has been cached, for example, into the secondary cache 232 as shown in FIG. 2. In this case, the data query apparatus 220 may first perform scanning of the data row in the secondary cache 232. If the data row that matches the determined primary index has been cached into the secondary cache 232, the data query apparatus 220 may determine the data row in the secondary cache 232. Otherwise, the data query apparatus 220 may perform scanning of the data row in the storage apparatus 240 to determine the data row that matches the determined primary index from the storage apparatus 240. In some embodiments, when the data row is determined from the storage apparatus 240, the data query apparatus 220 may backfill the data row into the secondary cache 232 to improve the efficiency of subsequent queries.

At block 530, the data query apparatus 220 determines whether the index row matches the data row.

In some embodiments, the index row may have a first tag identifying the time when the index row is written into the data table 140, and the data row may have a second tag identifying the time when the data row is last updated. In some embodiments, the data query apparatus 220 may determine whether the first tag matches the second tag. When the first tag does not match the second tag, the data query apparatus 220 may determine that the index row does not match the data row (e.g., in FIG. 4B, since the update time of the data row 451 does not match the write time of the index row 441, the data row 451 and the index row 441 do not match).

Additionally or alternatively, when the first tag matches the second tag, the data query apparatus 220 may further perform a comparison of the index information to determine whether the index row matches the data row. Taking the data row 451 and the index row 443 in FIG. 4B as an example, the timestamps of the two match. In this case, the data query apparatus 220 may regenerate a set of secondary indexes based on the data 430-3 in the data row 451 and the query rule of the data table 140. The data query apparatus 220 may determine whether the secondary index in the index row 443 is included in the regenerated set of secondary indexes. If the secondary index in the index row 443 is included in the regenerated set of secondary indexes, the data query apparatus 220 may determine that the data row 451 matches the index row 443; otherwise, the data query apparatus 220 may determine that the data row 451 does not match the index row 443.

If it is determined that the index row matches the data row, then at block 540, the data query apparatus 220 acquires the data from the data row as a response to the query request. For example, assuming that the data query apparatus 220 has determined that the data row 451 and the index row 443 as shown in FIG. 4B match, the data query apparatus 220 may acquire the data 430-3 from the data row 451 as a response to the query request.

If the index row does not match the data row, then at block 550, the data query apparatus 220 removes the index row from the data table 140. For example, assuming that the data query apparatus 220 has determined that the data row 451 and the index row 441 as shown in FIG. 4B do not match, the data query apparatus 220 may remove the index row 441 from the data table 140.

As can be seen from the above description, embodiments of the present disclosure implement low-cost and scalable storage and query techniques for entity data in a knowledge map, thereby solving the issues and/or other potential issues in the prior art. Embodiments of the present disclosure store the entity data and a primary index for indexing the entity data in a data row of a data table, and establish a secondary index for indexing the primary index based on a query rule for the data table. The secondary index and the primary index are stored in an index row in the same data table. When the entity data is updated, a new secondary index is generated and written to a new index row of the data table along with the primary index. The removal of the old index row is delayed until the actual data query is executed. In this way, embodiments of the present disclosure can ensure that the performance of data writing and data query does not degrade when entity data in a knowledge map is frequently updated.

Figure 6:
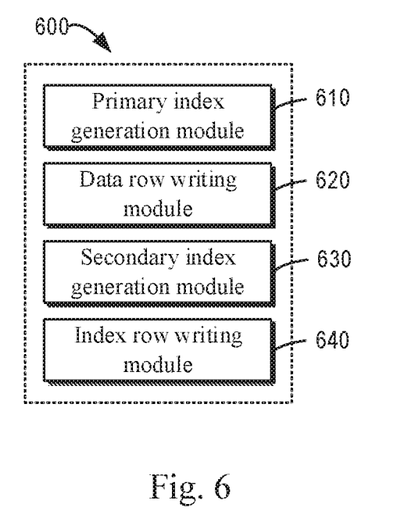
FIG. 6 shows a block diagram of an apparatus for storing data according to an embodiment of the present disclosure.

FIG. 6 shows a schematic block diagram of an apparatus 600 for storing data according to an embodiment of the present disclosure. The apparatus 600 may be used to implement the data storage apparatus 210 as shown in FIG. 2. As shown in FIG. 6, the apparatus 600 may include a primary index generation module 610, configured to generate, for to-be-stored data, a primary index for indexing the data; a data row writing module 620, configured to write the primary index and the data into a data row in a data table; a secondary index generation module 630, configured to generate a secondary index for indexing the primary index based on a query rule of the data table and the data; and an index row writing module 640, configured to write the secondary index and the primary index into an index row in the data table.

In some embodiments, the data records information related to an entity in a knowledge base, and the primary index generation module 610 includes: an identifier acquisition unit, configured to acquire an identifier of the entity from the data; and a primary index generation unit, configured to generate the primary index based on the identifier of the entity.

In some embodiments, the data row writing module includes: a first data row writing unit, configured to write the primary index as a key of the data row into the data row; and a second data row writing unit, configured to write the data as a value of the data row into the data row.

In some embodiments, the secondary index generation module includes: a configuration information acquisition unit, configured to acquire index configuration information of the data table, the index configuration information indicating the query rule of the data table; and a first generation unit, configured to generate the secondary index based on the index configuration information and the data.

In some embodiments, the data table is for storing one or more attribute values of the entity in the knowledge base, and/or a corresponding relationship between the entity and one or more objects, and the query rule for the data table includes at least one of the following: querying an entity having a specific attribute value; querying an entity having a specific relationship to a specific object; querying a positive edge relationship between a specific entity and a specific object; querying an inverse edge relationship between a specific entity and a specific object; querying data related to a specific entity; querying an entity having a specific positive edge relationship; and querying an entity having a specific inverse edge relationship.

In some embodiments, the secondary index generation module includes: a starting primary key determining unit, configured to determine a starting primary key of the data table; and a second generation unit, configured to generate the secondary index by using the starting primary key as a prefix of the secondary index.

In some embodiments, the index row writing module includes: a first index row writing unit, configured to write the secondary index as a key of the index row into the index row; and a second index row writing unit, configured to write the primary index as a value of the index row into the index row.

In some embodiments, the apparatus 600 further includes: a data updating module, configured to update the data in response to receiving a request to update the data stored in the data row; a new secondary index generation module, configured to generate a new secondary index for indexing the primary index based on updated data and the query rule; and a new index row writing module, configured to write the new secondary index and the primary index into another index row in the data table.

In some embodiments, the apparatus 600 further includes: a storing module, configured to store the data table in a storage apparatus implemented using a first storage medium; a first index row caching module, configured to cache the index row into a primary cache implemented using a second storage medium; and a first data row caching module, configured to cache the data row into a secondary cache implemented using a third storage medium.

In some embodiments, an access speed of the second storage medium exceeds an access speed of the third storage medium, and the access speed of the third storage medium exceeds an access speed of the first storage medium.

It should be understood that each of the modules recited in the apparatus 600 may correspond to each of the steps in the method 300 described with reference to FIG. 3, and has the same effect as the corresponding operation and feature in the method 300, and detailed description thereof will be omitted.

Figure 7:
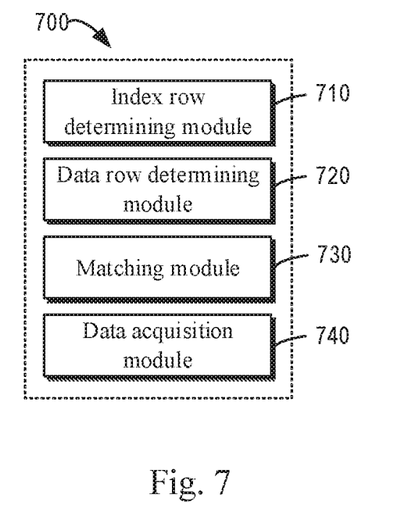
FIG. 7 shows a block diagram of an apparatus for querying data according to an embodiment of the present disclosure.

FIG. 7 shows a schematic block diagram of an apparatus 700 for querying data according to an embodiment of the present disclosure. The apparatus 700 may be used to implement the data query apparatus 220 as shown in FIG. 2. As shown in FIG. 7, the apparatus 700 may include an index row determining module 710, configured to determine an index row that matches a query request from one or more index rows of a data table, in response to receiving the query request for data stored in the data table, the index row storing a primary index for indexing the data and a secondary index for indexing the primary index; a data row determining module 720, configured to determine, from one or more data rows of the data table, a data row associated with the index row based on the primary index in the index row, the data row storing the primary index and the data; a matching module 730, configured to determine whether the index row matches the data row; and a data acquisition module 740, configured to acquire, in response to determining that the index row matches the data row, the data from the data row as a response to the query request.

In some embodiments, the data table is for storing one or more attribute values of an entity in a knowledge base, and/or a corresponding relationship between the entity and one or more objects, and the query request is for querying at least one of the following: an entity having a specific attribute value; an entity having a specific relationship to a specific object; an out edge relationship between a specific entity and a specific object; an in edge relationship between a specific entity and a specific object; data related to a specific entity; an entity specific out edge relationship; and an entity having a specific in edge relationship.

In some embodiments, the apparatus 700 further includes: an index row removing module, configured to remove the index row from the data table, in response to determining that the index row does not match the data row.

In some embodiments, the index row determining module 710 includes: a secondary index determining unit, configured to determine at least one part of the secondary index at least based on a keyword in the query request; and an index row determining unit, configured to determine the index row that matches the at least one part of the secondary index from the one or more index rows.

In some embodiments, the matching module 730 includes: a first tag acquisition unit, configured to acquire a first tag of the index row, the first tag identifying a first time when the index row is written into the data table; a second tag acquisition unit, configured to acquire a second tag of the data row, the second tag identifying a second time when the data row is updated; a tag matching unit, configured to determine whether the first tag matches the second tag; and a first match determining unit, configured to determine that the index row does not match the data row, in response to determining that the first tag does not match the second tag.

In some embodiments, the matching module 730 further includes: a secondary index generation unit, configured to generate a set of secondary indexes based on the data in the data row, in response to determining that the first tag matches the second tag; a secondary index matching unit, configured to determine whether the secondary index in the index row is included in the set of secondary indexes; a second match determining unit, configured to determine that the index row matches the data row, in response to determining that the secondary index in the index row is included in the set of secondary indexes; and a third match determining unit, configured to determine that the index row does not match the data row, in response to determining that the secondary index in the index row is missing in the set of secondary indexes.

In some embodiments, the data table is stored in a storage apparatus implemented using a first storage medium, and at least a part of the one or more index rows is cached into a primary cache implemented using a second storage medium. The index row determining module 710 includes: a primary cache searching unit, configured to determine whether the index row is cached into the primary cache; a first index row determining unit, configured to determine the index row from the primary cache, in response to determining that the index row is cached into the primary cache; and a second index row determining unit, configured to determine the index row from the storage apparatus, in response to determining that the index row is missing in the primary cache.

In some embodiments, the apparatus 700 further includes: a second index row caching mod configured to cache the index row into the primary cache, in response to the index row being determined from the storage apparatus.

In some embodiments, at least a part of the one or more data rows is cached into a secondary cache implemented using a third storage medium. The data row determining module 720 includes: a secondary cache searching unit, configured to determine whether the data row is cached into the secondary cache; a first data row determining unit, configured to determine the data row from the secondary cache, in response to determining that the data row is cached in the secondary cache; and a second data row determining unit, configured to determine the data row from the storage apparatus, in response to determining that the data row is missing in the secondary cache.

In some embodiments, the apparatus 700 further includes: a second data row caching module, configured to cache the data row into the secondary cache, in response to the data row being determined from the storage apparatus.

In some embodiments, an access speed of the second storage medium exceeds an access speed of the third storage medium, and the access speed of the third storage medium exceeds an access speed of the first storage medium.

It should be understood that each of the modules recited in the apparatus 700 may correspond to each of the steps in the method 500 described with reference to FIG. 5, and has the same effect as the corresponding operation and feature in the method 500, and detailed description thereof will be omitted.

In addition, the modules and/or units included in the apparatus 600 and/or 700 may be implemented in various methods, including software, hardware, firmware, or any combination thereof. In some embodiments, one or more units may be implemented using software and/or firmware, such as machine-executable instructions stored on a storage medium. In addition to or in lieu of machine-executable instructions, some or all of the units in the apparatus 600 and/or 700 may be implemented, at least in part, by one or more hardware logic components. By way of example and not limitation, exemplary types of hardware logic components that may be used include Field Programmable Gate Array (FPGA), Application Specific Integrated Circuit (ASIC), Application Specific Standard Product (ASSP), System on Chap (SOC), Complex Programmable Logic Device (CPLD), and so on.

The modules and/or units illustrated in FIGS. 6 and/or 7 may be implemented, in part or in whole, as hardware modules, software modules, firmware modules, or any combination thereof. Specifically, in some embodiments, the flows, methods, or processes described above may be implemented by a storage system or a host corresponding to the storage system or hardware in other computing device independent of the storage system.

Figure 8:
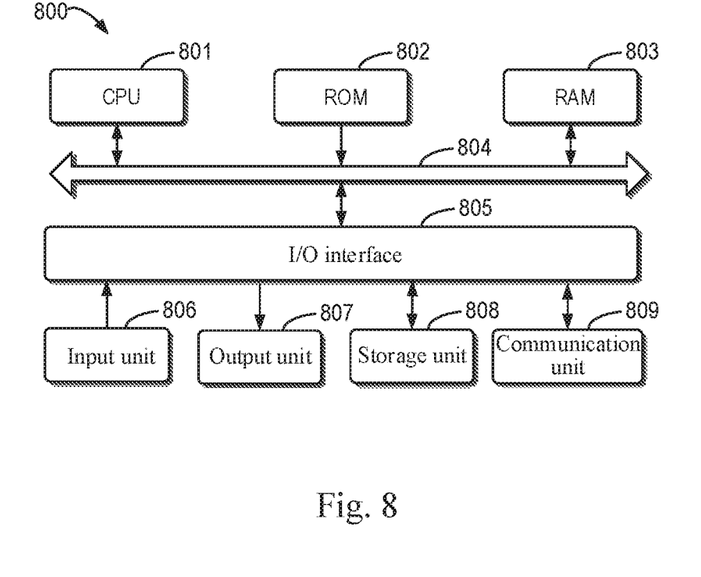
FIG. 8 shows a block diagram of a computing device in which embodiments of the present disclosure may be implemented.

FIG. 8 shows a schematic block diagram of an example device 800 capable of implementing various embodiments of the present disclosure. The device 800 may be used to implement the apparatus 800 for managing an index of the present disclosure. As shown in the figure, the device 800 includes a central processing unit (CPU) 801 that may perform various appropriate actions and processing in accordance with computer program instructions stored in a read only memory (ROM) 802 or computer program instructions loaded into a random access memory (RAM) 803 from a storage unit 808. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 309 allows the device 800 to exchange information/data with other devices over a computer network such as the Internet and/or various telecommunication networks.

The processing unit 801 performs the various methods and processes described above, such as the process 300 and/or the process 500. For example, in some embodiments, the process 300 and/or the process 500 may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the process 300 and/or the process 500 described above may be performed. Alternatively, in other embodiments, the CPU 801 may be configured to perform the process 300 and/or the process 500 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject mattes defined in the appended claims is not limited to the specific features or actions described above. Instead, the specific features and actions described above are merely exemplary forms of implementing the claims.

What is claimed is:

1. A method for storing data, the data recording information related to an entity in a knowledge base, the method comprising:
    generating, for to-be-stored data, a primary index for indexing the data;
    writing the primary index and the data into a data row in a data table, wherein the data table is for storing one or more attribute values of the entity in the knowledge base, and/or a corresponding relationship between the entity and one or more objects;
    generating a secondary index for indexing the primary index based on a query rule of the data table and the data, the query rule of the data table indicating a query mode supported by the data table, wherein the generating the secondary index comprises: writing an expression related to the query rule into the secondary index;
    writing the secondary index and the primary index into an index row in the data table;
    updating the data in response to receiving a request to update the data stored in the data row;
    generating a new secondary index for indexing the primary index based on updated data and the query rule; and
    writing the new secondary index and the primary index into another index row in the data table.

2. The method according to claim 1, wherein generating the primary index comprises:
    acquiring an identifier of the entity from the data; and
    generating the primary index based on the identifier of the entity.

3. The method according to claim 1, wherein writing the primary index and the data into the data row comprises:
    writing the primary index as a key of the data row into the data row; and
    writing the data as a value of the data row into the data row.

4. The method according to claim 1, wherein generating the secondary index comprises:
    acquiring index configuration information of the data table, the index configuration information indicating the query rule of the data table; and
    generating the secondary index based on the index configuration information and the data.

5. The method according to claim 1, wherein the query rule comprises at least one of:
    querying an entity having a specific attribute value;
    querying an entity having a specific relationship to a specific object;
    querying an out-edge relationship between a specific entity and a specific object;
    querying an in-edge relationship between a specific entity and a specific object;
    querying data related to a specific entity;
    querying an entity having a specific out edge relationship; and
    querying an entity having a specific in edge relationship,
    wherein the in edge relationship and the out edge relationship are based on a triplet in a form of subject-predicate-object (SPO).

6. The method according to claim 1, wherein generating the secondary index comprises:
    determining a starting primary key of the data table; and
    generating the secondary index by using the starting primary key of the data table as a prefix of the secondary index.

7. The method according to claim 1, wherein writing the secondary index and the primary index into the index row comprises:
    writing the secondary index as a key of the index row into the index row; and
    writing the primary index as a value of the index row into the index row.

8. The method according to claim 1,
    wherein removal of the index row from the data table is delayed until a data query is executed.

9. The method according to claim 1, further comprising:
    storing the data table in a storage apparatus implemented using a first storage medium;
    caching the index row into a primary cache implemented using a second storage medium; and
    caching the data row into a secondary cache implemented using a third storage medium.

10. The method according to claim 9, wherein an access speed of the second storage medium exceeds an access speed of the third storage medium, and the access speed of the third storage medium exceeds an access speed of the first storage medium.

11. A non-transitory computer readable storage medium, storing a computer program thereon, wherein the computer program, when executed by a processor, implements the method according to claim 1.

12. A method for querying data, the data recording information related to an entity in a knowledge base, the method comprising:
    determining an index row that matches a query request from one or more index rows of a data table, in response to receiving the query request for data stored in the data table, the index row storing a primary index and a secondary index indexing the primary index, wherein the data table is for storing one or more attribute values of the entity in the knowledge base, and/or a corresponding relationship between the entity and one or more objects, wherein the secondary index is generated through writing an expression related to a query rule into the secondary index, the query rule of the data table indicating a query mode supported by the data table;
    determining, from one or more data rows of the data table, a data row associated with the index row based on the primary index in the index row, the data row storing the primary index and the data, the primary index indexing the data;
    determining whether the index row matches the data row;
    acquiring, in response to the index row matching the data row, the data from the data row as a response to the query request; and
    removing the index row from the data table, in response to determining that the index row does not match the data row.

13. The method according to claim 12, wherein the query request is for querying at least one of:
    an entity having a specific attribute value;
    an entity having a specific relationship to a specific object;

an out-edge relationship between a specific entity and a specific object;

an in-edge relationship between a specific entity and a specific object;

data related to a specific entity;

an entity having a specific out edge relationship; and an entity having a specific in edge relationship, wherein the in edge relationship and the out edge relationship are based on a triplet in a form of subject-predicate-object (SPO).

14. The method according to claim 12, wherein determining the index row from the one or more index rows comprises:

determining at least one part of the secondary index at least based on a keyword in the query request; and determining the index row that matches the at least one part of the secondary index from the one or more index rows.

15. The method according to claim 12, wherein the method further comprises:

acquiring a first tag of the index row, the first tag identifying a first time when the index row is written into the data table;

acquiring a second tag of the data row, the second tag identifying a second time when the data row is updated;

determining whether the first tag matches the second tag; and determining that the index row does not match the data row, in response to determining that the first tag does not match the second tag.

16. The method according to claim 15, wherein the method further comprises:

generating a set of secondary indexes based on the data in the data row, in response to determining that the first tag matches the second tag;

determining whether the secondary index in the index row is included in the set of secondary indexes;

determining that the index row matches the data row, in response to determining that the secondary index in the index row is included in the set of secondary indexes; and determining that the index row does not match the data row, in response to determining that the secondary index in the index row is missing in the set of secondary indexes.

17. The method according to claim 12, wherein the data table is stored in a storage apparatus implemented using a first storage medium, at least a part of the one or more index rows is cached into a primary cache implemented using a second storage medium, and determining the index row from the one or more index rows comprises:

determining whether the index row is cached into the primary cache;

determining the index row from the primary cache, in response to determining that the index row is cached into the primary cache; and determining the index row from the storage apparatus, in response to determining that the index row is missing in the primary cache.

18. The method according to claim 17, further comprising:

caching the index row into the primary cache, in response to the index row being determined from the storage apparatus.

19. The method according to claim 17, wherein at least a part of the one or more data rows is cached into a secondary cache implemented using a third storage medium, and determining the data row from the one or more data rows comprises:

determining whether the data row is cached into the secondary cache;

determining the data row from the secondary cache, in response to determining that the data row is cached in the secondary cache; and determining the data row from the storage apparatus, in response to determining that the data row is missing in the secondary cache.

20. The method according to claim 19, further comprising:

caching the data row into the secondary cache, in response to the data row being determined from the storage apparatus.

21. The method according to claim 19, wherein an access speed of the second storage medium exceeds an access speed of the third storage medium, and the access speed of the third storage medium exceeds an access speed of the first storage medium.

22. A non-transitory computer readable storage medium, storing a computer program thereon, wherein the computer program, when executed by a processor, implements the method according to claim 12.

23. An apparatus for storing data, the data recording information related to an entity in a knowledge base, the apparatus comprising:

at least one processor; and a memory storing instructions, the instructions when executed by the at least one processor, cause the at least one processor to perform operations, the operations comprising:

generating, for to-be-stored data, a primary index for indexing the data;

writing the primary index and the data into a data row in a data table, wherein the data table is for storing one or more attribute values of the entity in the knowledge base, and/or a corresponding relationship between the entity and one or more objects;

generating a secondary index for indexing the primary index based on a query rule of the data table and the data, the query rule of the data table indicating a query mode supported by the data table, wherein the generating the secondary index comprises: writing an expression related to the query rule into the secondary index;

writing the secondary index and the primary index into an index row in the data table;

updating the data in response to receiving a request to update the data stored in the data row;

generating a new secondary index for indexing the primary index based on updated data and the query rule;

writing the new secondary index and the primary index into another index row in the data table.

24. An apparatus for querying data, the data recording information related to an entity in a knowledge base, the apparatus comprising:

at least one processor; and a memory storing instructions, the instructions when executed by the at least one processor, cause the at least one processor to perform operations, the operations comprising:

determining an index row that matches a query request from one or more index rows of a data table, in response to receiving the query request for data stored in the data table, the index row storing a primary index and a secondary index indexing the primary index, wherein the data table is for storing one or more attribute values of the entity in the knowledge base, and/or a corresponding relationship between the entity and one or more objects, wherein the secondary index is generated through writing an expression related to a query rule into the secondary index, the query rule of the data table indicating a query mode supported by the data table;

determining, from one or more data rows of the data table, a data row associated with the index row based on the primary index in the index row, the data row storing the primary index and the data, the primary index indexing the data;

determining whether the index row matches the data row;

acquiring, in response to the index row matching the data row, the data from the data row as a response to the query request; and removing the index row from the data table, in response to determining that the index row does not match the data row.

\* \* \* \* \*